United States Patent [19]
Mayer et al.

[11] Patent Number: 5,015,293
[45] Date of Patent: May 14, 1991

[54] METHOD OF FORMING A CROSSLINKED CHITOSAN POLYMER AND PRODUCT THEREOF

[75] Inventors: Jean M. Mayer, Smithfield, R.I.; David L. Kaplan, Stow, Mass.

[73] Assignee: The United States of America as represented by the Secretary of the Army, Washington, D.C.

[21] Appl. No.: 408,975

[22] Filed: Sep. 18, 1989

[51] Int. Cl.$^5$ .................. C08L 5/08; C08B 37/08
[52] U.S. Cl. .................. 106/162; 106/163.1; 536/20; 523/128; 523/447
[58] Field of Search .................. 106/162, 163.1, 205; 346/135.1; 536/20; 523/447, 128

[56] References Cited
U.S. PATENT DOCUMENTS 4,895,724 1/1990 Cardinal et al. .................. 604/890.1

FOREIGN PATENT DOCUMENTS 1294596 3/1961 France .

OTHER PUBLICATIONS

CA102(13):111454v, Cassani et al., 1984.
CA100(17):137527e, Yang et al., 1984.
CA105(26):231914d, Asao et al., 1986.

Primary Examiner—Theodore Morris
Assistant Examiner—David M. Brunsman
Attorney, Agent, or Firm—Richard J. Donahue; Lawrence E. Labadini

[57] ABSTRACT

A method of forming a crosslinked chitosan polymer comprises contacting chitosan with a basic solution of an epihalohydrin compound and heating the resulting mixture to a temperature and for a time sufficient to effect crosslinking of the chitosan. The crosslinked chitosan polymer exhibits water insolubility and biodegradability.

18 Claims, No Drawings

METHOD OF FORMING A CROSSLINKED CHITOSAN POLYMER AND PRODUCT THEREOF

The invention described herein may be manufactured, used and licensed by or for the Government for governmental purposes without the payment to us of any royalty thereon.

FIELD OF THE INVENTION

The present invention relates to a method of forming a crosslinked chitosan polymer and to the product produced by such a method. More particularly, the present invention relates to a method of forming a crosslinked chitosan polymer which exhibits water insolubility, low oxygen permeability and biodegradability, and to the resulting polymer.

BACKGROUND OF THE INVENTION

The increased use of synthetic plastic materials in packaging applications is simultaneously imposing increased environmental and ecological hazards owing to the nonbiodegradability of such plastics. Accordingly, there is a great need for a plastic packaging material which is water-insoluble and has low oxygen permeability in order to provide storage stability to the packaged contents, yet which is biodegradable upon disposal. At least one partially biodegradable copolymer has been disclosed as comprising a mixture of starch and polyethylene. After disposal, the starch degrades and initiates the breakdown of polyethylene into disposable fragments. However, a significant disadvantage of this type of copolymer resides in its long degradation time which is reported to be from several months to several years or more and the non-biodegradability of the PE fragments. Accordingly, a need still exists for the discovery of additional, totally biodegradable plastic materials.

SUMMARY OF THE INVENTION

Accordingly, it is an object of the present invention to provide a method for forming a crosslinked polymer material. ,It is a further object of the invention to provide a method for forming a crosslinked polymer material which exhibits water insolubility, low oxygen permeability and biodegradability. It is a related object of the invention to provide a new crosslinked polymer material which exhibits water insolubility, low oxygen permeability and biodegradability and which is suitable for use in the packaging industry and is suitable for use in various other applications such as biomedical implants, degradable sutures, slow-release polymers for drug administration, and the like.

These and additional objects are provided by the present invention which relates to a method of forming a crosslinked chitosan polymer and to the product of such a process. More particularly, according to the method of the present invention, chitosan is contacted with a basic solution of an epihalohydrin compound which acts as a crosslinking agent. The resulting mixture is heated to a temperature and for a time sufficient to affect crosslinking of the chitosan. The crosslinking reaction which occurs does not eliminate the cationic amine function of the chitosan. Another polysaccharide or other suitable polymer compounds may be included in the basic solution whereby a crosslinked chitosan copolymer is produced. The resulting crosslinked polymers exhibit water insolubility, low oxygen permeability and biodegradability and good strength, which properties combine to provide a material advantageous for use in the packaging industry and in other various applications.

These and additional objects and advantages provided by the present invention will be more fully understood in view of the following detailed description.

DETAILED DESCRIPTION

The present invention relates to a method of forming a crosslinked chitosan polymer. Chitosan comprises the deacetylated derivative of chitin which is a glucosamine polysaccharide. Chitin contains about 7% nitrogen, is structurally similar to cellulose and is of the following formula:

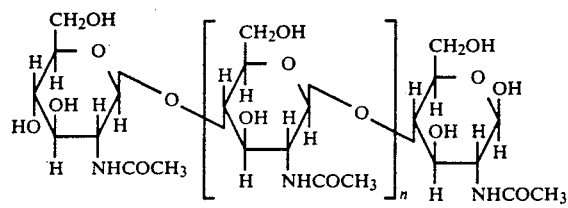

According to the method of the present invention, the chitosan is crosslinked by contacting the chitosan, which can be in the form of a film or a slurry, with a basic solution of an epihalohydrin compound. Epihalohydrin compounds are well known in the art and are of the general formula:

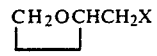

wherein X is a halogen. The epihalohydrin compound acts as a crosslinking agent but does not eliminate the cationic amine function of the chitosan in the crosslinking reaction. The solution of the epihalohydrin compound is strongly basic and preferably has a pH greater than about 9. More preferably, the basic solution of the epihalohydrin compound has a pH greater than about 10. A preferred base for forming the solution comprises sodium hydroxide although various other basic compounds may be employed. Additionally, a preferred epihalohydrin compound comprises epichlorohydrin. The basic solution is employed in an amount sufficient to affect crosslinking of the chitosan. Preferably, the basic solution is employed in an amount sufficient to provide from about 0.05 to about 0.25 moles of epihalohydrin compound per mole of chitosan. Varying the amount of epihalohydrin compound used in the crosslinking reaction alters the solubility of the resulting crosslinked polymer in acidic solutions.

In the slurry method, a mixture of powdered chitosan and the basic solution is heated to a temperature and for a time sufficient to effect the crosslinking reaction. Preferably, the resulting mixture is heated to a temperature of at least about 35° C. and more preferably to a temperature of about 40° C. While the time required for crosslinking may vary depending on the other reaction parameters employed, it is preferred that the resulting mixture is heated for at least about two hours in order to provide sufficient crosslinking of the chitosan.

The chitosan is not soluble in the basic solution of the epihalohydrin compound. The chitosan and the basic solution are contacted and heated, for example in a vented oven or the like, to affect crosslinking. The crosslinked material may be collected by filtration or the like and may be further processed as necessary. For example, the crosslinked material may be made into films, fibers or the like by dissolving in a suitable solvent, for example acetic acid, formic acid or the like, and processing using standard techniques.

In an alternate embodiment, a crosslinked film of chitosan may be produced by first casting a chitosan film from an acid solution, for example an acetic acid solution, and then covering the film with a basic solution of an epihalohydrin compound such as epichlorohydrin. The film is then heated to effect crosslinking. A solid residue from the base solution may be washed off the film followed by drying of the film. It has been discovered that a thus produced film shrinks considerably during drying, whereby the film is advantageous for use in shrink wrap applications. Additionally, the wetted film is sufficiently strong to allow stretching in order to increase the film's tensile strength.

In a further embodiment of the invention, the basic solution of the epihalohydrin compound may further include an additional polysaccharide or other suitable polymer whereby the resulting crosslinked material comprises a copolymer of chitosan and the second polymer. Preferred polymers for use in the present method comprise pullulan, levan, elsinan, starch, dextran and cellulose and other suitable synthetic or biologically derived polymers such as polyethylene, polypropylene, nylon, polyhydroxyalkanoates, and the like.

The crosslinked chitosan polymers and crosslinked chitosan copolymers produced according to the methods of the present invention are insoluble in water, dilute bases, dilute acids, alcohols, ethers and ketones. The crosslinked polymers and copolymers may be solubilized in concentrated acid, for example concentrated formic acid, with heating, and the resulting solutions may be used to wet spin fibers and the like. The crosslinked polymers retain the good tensile strength of chitosan as well as its polycationic amine nature. The cationic amine function of the crosslinked polymers renders the polymers useful in chelation processes, for example in the recovery of metals from waste water. The crosslinked polymers also exhibit low oxygen permeability.

Additionally, the crosslinked polymers produced according to the methods of the present invention exhibit biodegradability which makes their use in the packaging industry and in other applications extremely advantageous. For example, crosslinked polymers prepared according to the methods of the present invention were tested for biodegradability using an ATCC fungal spore mixture containing the following organisms: *Aspercillus nicer, Aspercillus flavus, Asperoillus versicolor, Chaetomium clobosum, Penicillium funiculosum, Gliocladium virens* and *Aureobasidium pullulans*. The crosslinked polymers were shown to support *Chaetomium ulobosum* growth. Samples placed in soil burial were shown to lose tensile strength after three weeks of soil burial.

The following examples further demonstrate the methods and products according to the present invention.

EXAMPLE 1

This example demonstrates the formation of a crosslinked polymer film according to the present invention. 3.2 g of chitosan was dispersed in 125 ml of distilled water containing 0.05% sodium azide as a preservative. To this dispersion 125 ml of a 4% acetic acid solution was added. The resulting mixture was stirred to dissolve the chitosan. The solution was cast on a level 245 mm square polypropylene dish and dried in a vented oven at 40° C. until a film was formed. 200 ml of a 0.067 M sodium hydroxide solution containing epichlorohydrin was poured on top of the chitosan film and dried in a 40° C. vented oven. The solution of epichlorohydrin was applied in an amount sufficient to provide 0.125 moles epichlorohydrin per mole of chitosan. The resulting film was washed and clamped in a slightly stretched position until dry. The resulting film had a 0.037 mm thickness, 2.7% elongation and a 136 MPa tensile strength. The uncrosslinked chitosan had a thickness of 0.035 mm, an elongation of 2.9% and a tensile strength of 51 MPa. The wet strength and wet percent elongation of the crosslinked chitosan were 13.1 MPa and 47%, respectively. On the other hand, the wet strength of the uncrosslinked chitosan was 0.5 MPa and its wet percent elongation was 62%.

EXAMPLE 2

An uncrosslinked chitosan film was prepared as in Example 1. A 0.067 M sodium hydroxide solution containing epichlorohydrin and 3.2 g of a second polymer, pullulan, was poured on the chitosan film and processed in the same manner as Example 1. The resulting film comprised crosslinked chitosan/pullulan copolymer. Similar films were prepared wherein the second polymer which is soluble in basic solution was selected from levan, elsinan, starch, dextran and other suitable polymers. The amounts of epichlorohydrin employed in the basic solution varied from 0.05 to 0.25 mole percent per mole of chitosan.

EXAMPLE 3

This example demonstrates the preparation of a crosslinked polymer product which may be formed into fibers, a film or the like using standard processing techniques. 3.2 g of chitosan was dispersed in 200 ml of a 0.067 M sodium hydroxide solution. Epichlorohydrin was added while the mixture was stirred. The slurry was stirred and heated at 40° C. for two to four hours. The crosslinked chitosan was then collected by filtration. The resulting crosslinked product was suitable for use in preparing films and/or fibers by dissolving in a suitable solvent such as acetic acid and processing using standard techniques. Similar products were also prepared wherein a second polymer such as cellulose, polyethylene, polypropylene, nylon or a polyhydroxyalkanoate were employed. These second polymers do not have to be soluble in basic solution. The resulting products comprised crosslinked chitosan copolymers. Although the epichlorohydrin was not mixed with the sodium hydroxide solution prior to addition of the sodium hydroxide solution to the chitosan, the method of this example is within the scope of the present method wherein chitosan is contacted with a basic solution containing an epihalohydrin compound.

The preceding examples are set forth to illustrate specific embodiments of the invention and are not intended to limit the scope of the methods and products of the present invention. Additional embodiments and advantages within the scope of the claimed invention will be apparent to one of ordinary skill in the art.

What is claimed is:

1. A method of forming a crosslinked chitosan polymer, comprising contacting chitosan with a basic solution of an epihalohydrin compound having a pH greater than 9, and heating the resulting mixture to a temperature between 35° C. and 45° C. and for a time sufficient to effect crosslinking of the chitosan.

2. A method as defined by claim 1, wherein the basic solution of the epihalohydrin compound has a pH greater than about 10.

3. A method as defined by claim 1, wherein the basic solution is employed in an amount sufficient to provide from about 0.05 to about 0.25 moles of epihalohydrin compound per mole of chitosan.

4. A method as defined by claim 1, wherein the epihalohydrin compound comprises epichlorohydrin.

5. A method as defined by claim 1, wherein the basic solution comprises sodium hydroxide.

6. A method as defined by claim 1, wherein the resulting mixture is heated to a temperature of about 40° C.

7. A method as defined by claim 1, wherein the resulting mixture is heated for at least about two hours.

8. A method as defined by claim 1, wherein the basic solution of the epihalohydrin compound further includes a second polymer.

9. A method as defined by claim 8, wherein the second polymer is selected from the group consisting of pullulan, levan, elsinan, starch, dextran, cellulose, polyethylene, polypropylene, nylon and polyhydroxyalkanoates.

10. A method as defined by claim 1, wherein the resulting crosslinked polymer is formed into a film.

11. A method as defined by claim 1, wherein the resulting crosslinked polymer is formed into fibers.

12. A method of forming a crosslinked chitosan polymer film, comprising dissolving chitosan in an acidic solution, casting the solution into a film, contacting the film with a basic solution of an epihalohydrin compound having a pH greater than, and drying the film at a temperature of at least about 35°.

13. A method as defined by claim 12, wherein the basic solution of the epihalohydrin compound further includes a second polymer.

14. A crosslinked chitosan polymer formed by contacting chitosan with a basic solution of an epihalohydrin compound having a pH greater than 9 and heating the resulting mixture to a temperature between 35° C. and 45° C. and for a time sufficient to effect crosslinking of the chitosan.

15. A crosslinked chitosan polymer as defined by claim 14, wherein the epihalohydrin compound comprises epichlorohydrin.

16. A crosslinked chitosan polymer as defined by claim 14, wherein the basic solution is employed in an amount sufficient to provide from about 0.05 to about 0.25 moles of epihalohydrin compound per mole of chitosan.

17. A crosslinked chitosan polymer as defined by claim 14, wherein the basic solution of the epihalohydrin compound further includes a second polymer.

18. A crosslinked chitosan polymer as defined by claim 17, wherein the second polymer is selected from the group consisting of pullulan, levan, elsinan, starch, dextran, cellulose, polyethylene, polyproxpylene, nylon and polyhydroxyalkanoates.

* * * * *